(12) United States Patent
Owen

(10) Patent No.: US 8,631,994 B2
(45) Date of Patent: Jan. 21, 2014

(54) FRICTION-WELD INTERFACE FOR AN ASSEMBLY

(75) Inventor: Shawn Michael Owen, Ortonville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 330 days.

(21) Appl. No.: 12/912,861

(22) Filed: Oct. 27, 2010

(65) Prior Publication Data

US 2012/0103295 A1 May 3, 2012

(51) Int. Cl.
*B23K 20/12* (2006.01)
*F02M 35/10* (2006.01)

(52) U.S. Cl.
USPC .................. 228/2.1; 228/2.3; 123/184.21

(58) Field of Classification Search
USPC .................. 219/617, 59.1, 121.13, 55
See application file for complete search history.

(56) References Cited

U.S. PATENT DOCUMENTS 5,992,369 A * 11/1999 Mehne ................. 123/184.21
7,082,915 B2 * 8/2006 Tanikawa et al. ........ 123/184.42
7,451,732 B1 * 11/2008 Vichinsky et al. ........ 123/184.47
7,998,090 B2 * 8/2011 Simpson et al. ............ 600/585
2006/0254552 A1 * 11/2006 Brachos et al. .......... 123/184.46

FOREIGN PATENT DOCUMENTS

| DE | 4335530 A1 | 4/1994 |
| JP | 56046723 A | 4/1981 |
| JP | 5023874 A | 2/1993 |
| JP | 6047570 A | 2/1994 |
| JP | 2000301364 A | 10/2000 |
| JP | 2003112270 A | 4/2003 |

* cited by examiner

*Primary Examiner* — Lindsay Low
*Assistant Examiner* — Syed O Hasan
(74) *Attorney, Agent, or Firm* — Quinn Law Group, PLLC

(57) ABSTRACT

A friction-weld interface device for improving a structural strength of an assembly includes a first component having a concave tapered surface. The friction-weld interface also includes a second component having a convex tapered surface that is complementary to and is configured to receive the concave tapered surface of the first component. The assembly is formed by friction welding the concave tapered surface to the convex tapered surface. The friction-weld interface device may be used to assemble an air-intake manifold for an internal combustion engine, wherein the air-intake manifold is at least partially joined by the process of friction welding.

18 Claims, 2 Drawing Sheets

FIG. 1
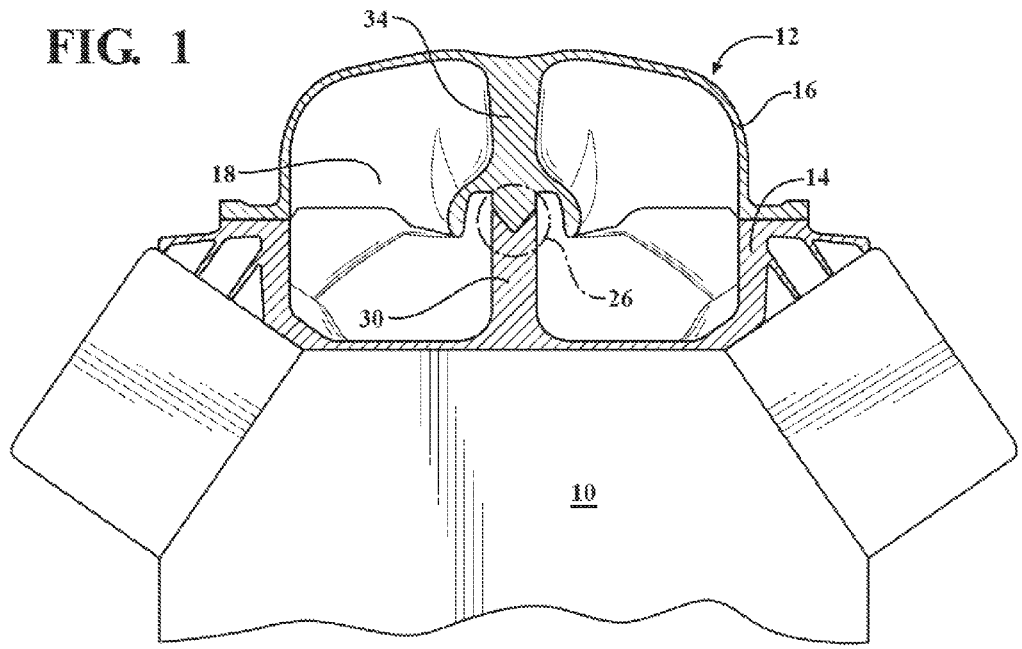
FIG. 2
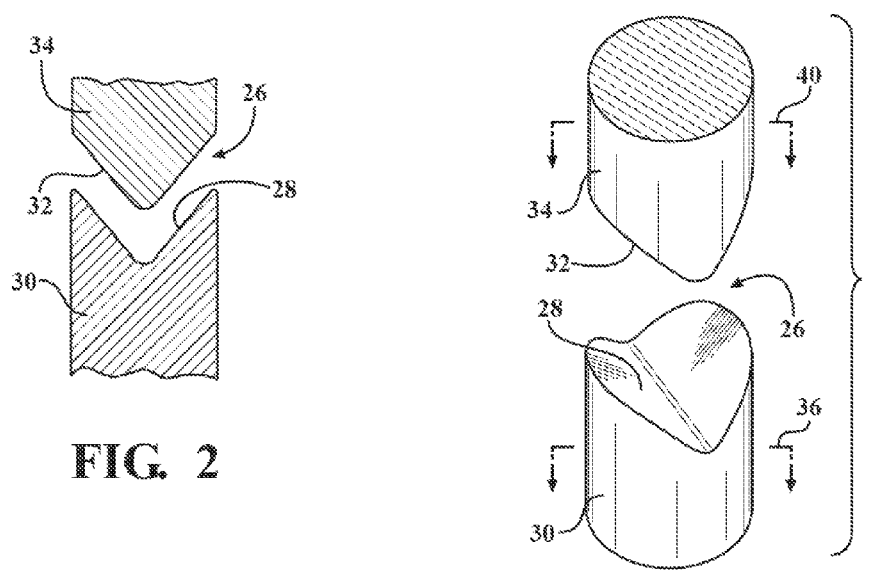
FIG. 3

US 8,631,994 B2

FRICTION-WELD INTERFACE FOR AN ASSEMBLY

TECHNICAL FIELD

The invention relates to a friction-weld interface for an assembly of components.

BACKGROUND

Various objects may be manufactured via molding processes. Molding is often employed to produce objects from various polymers and other types of plastic materials. Common molding processes include blow molding and injection molding.

Blow molding and injection molding both typically employ heated thermoplastic materials to conform to a shape created in a specially designed tool, or mold cavity. Blow molding is generally employed to produce hollow objects of relatively simple shape with loosely controlled thickness. Injection molding, on the other hand, is generally employed to produce objects of more complex shape, and is frequently employed where an object with more precise dimensional control is required.

Molded plastic components may be joined or assembled via a friction-welding process wherein heat is generated through mechanical friction between a moving component and a stationary component. A lateral force called an "upset" is typically added during the friction-welding process to plastically displace and fuse the materials of the components sought to be joined.

SUMMARY

A friction-weld interface device for improving a structural strength of an assembly includes a first component having a concave tapered surface. The friction-weld interface device also includes a second component having a convex tapered surface that is complementary to and is configured to receive the concave tapered surface of the first component. The assembly is formed by friction welding the concave tapered surface to the convex tapered surface.

The first component may include a first post having a first leading portion and the second component may include a second post having a second leading portion. In such a case, the concave tapered surface may be formed on the first leading portion and the convex tapered surface may be formed on the second leading portion.

The first post may be characterized by having a first substantially circular shape when viewed in a cross-sectional plan view. Additionally, the second post may be characterized by having a second substantially circular shape when viewed in a cross-sectional plan view, such that the second substantially circular shape is complementary to the first substantially circular shape.

The first post may also be characterized by having a first substantially elliptical shape when viewed in a cross-sectional plan view. Additionally, the second post may be characterized by a cross-sectional plan view having a second substantially elliptical shape that is complementary to the first substantially elliptical shape.

The concave tapered surface may be characterized by a cross-sectional side view having a first chevron shape. Additionally, the convex tapered surface may be characterized by a cross-sectional side view having a second chevron shape that is complementary to the first chevron shape. In such a case, the friction-welding of the first component and the second component may be accomplished by a process of vibration welding.

The concave tapered surface may be characterized by a first cone shape. Additionally, the convex tapered surface may be characterized by a second cone shape that is complementary to the first cone shape. In such a case, the friction-welding of the first component and the second component may be accomplished by a process of spin welding.

The first and second components may each be formed from a thermoplastic material. Furthermore, the friction-weld interface may be used to assemble an air-intake manifold for an internal combustion engine, wherein the air-intake manifold is at least partially joined by the process of friction welding.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of an internal combustion engine shown with a cross-sectional view of an air-intake manifold employing a friction-weld interface device having a first post and a second post;

FIG. 2 is a cross-sectional view of the friction-weld interface device employed in the air-intake manifold illustrated in FIG. 1;

FIG. 3 illustrates a perspective view of a first embodiment of the friction-weld interface device shown in FIG. 2;

DETAILED DESCRIPTION

Figure 4:
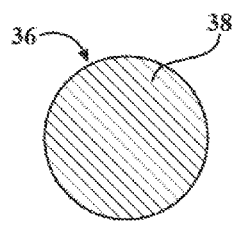
FIG. 4 illustrates a plan view of the first post of the friction-weld interface device shown in FIG. 3.

Referring to the drawings, wherein like reference numbers refer to like components, FIG. 1 shows an internal combustion engine 10, as commonly utilized on motor vehicles (not shown). The engine 10 includes an air-intake manifold assembly 12. The air-intake manifold assembly 12 is formed from a first component 14 which is a lower shell, and a second component 16 which is an upper shell. When joined, the components 14, 16 form a generally enclosed chamber 18 that is typically connected by an inlet (not shown) with ambient air, and by an outlet (not shown) with combustion chambers of the engine 10.

The air-intake manifold assembly 12 is attached to the engine 10 in a fixed manner to thereby facilitate reliable performance of its function. During the operation of engine 10, air-intake manifold assembly 12 is likely to be subjected to elevated internal pressure, extreme temperatures and vibration, and is thus required to exhibit a rigid and durable structure. As shown herein, each of the components 14 and 16 is molded from a thermoplastic material. The components 14 and 16 may, however, be formed from various metals, such as aluminum, or be formed from dissimilar materials.

The air-intake manifold assembly 12 includes a friction-weld interface device 26 designed to for improving a structural strength of the air-intake manifold, i.e., to reliably connect and fuse together components 14, 16. Although shown as part of the air-intake manifold assembly 12, friction-weld interface device 26 may be employed to fuse components and thereby maintain the structure of various other devices. Friction welding has multiple advantages over other component joining techniques such as gluing or other types of welding employing a filer material. Typical advantages of friction-welding include fast joining times, typically on the order of a few seconds, generation of a full strength bond without additional weight, and ability to join dissimilar materials.

FIG. 2 shows a cross-sectional view of the friction-weld interface device 26. As shown in FIG. 2, the friction-weld interface device 26 includes a concave tapered surface 28. The concave tapered surface 28 is incorporated into a first post 30. The first post 30 is included in, and is an integral part of the first component 14. The friction-weld interface device 26 also includes a convex tapered surface 32. The convex tapered surface 32 is incorporated into a second post 34. The second post 34 is included in and is an integral part of the second component 16. The second post 34 is designed to provide reinforcement to the structure of air-intake manifold assembly 12 when the second post is joined with the first post 30. Accordingly, the convex tapered surface 32 is complementary to and is configured to receive concave tapered surface 28 when the first and second posts 30, 34 are joined. The term "complementary" as employed herein, indicates that the tapered surfaces 28 and 32 are designed to substantially match and cover one another when the first post 30 is joined with the second post 34. As a result, the air-intake manifold assembly 12 is formed by friction-welding and fusing the concave tapered surface 28 to the convex tapered surface 32.

Figure 5:
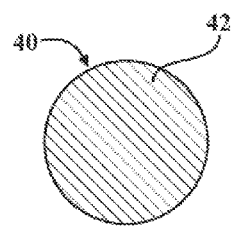
FIG. 5 illustrates a plan view of the second post of the friction-weld interface device shown in FIG. 3.
Figure 6:
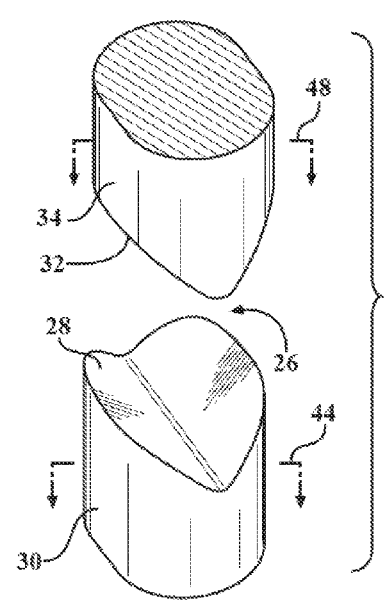
FIG. 6 illustrates a perspective view of a second embodiment of the friction-weld interface device shown in FIG. 2.
Figure 7:
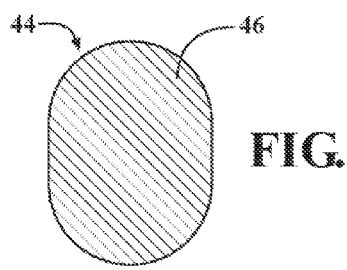
FIG. 7 illustrates a plan view of the first post of the friction-weld interface device shown in FIG. 6.
Figure 8:
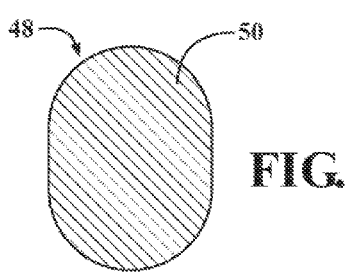
FIG. 8 illustrates a plan view of the second post of the friction-weld interface device shown in FIG. 6.

FIG. 3 illustrates a first embodiment of the friction-weld interface device 26 having first post 30 and second post 34. According to the first embodiment, the first post 30 may be characterized by a cross-sectional plan view 36. The cross-sectional plan view 36 has a first substantially circular shape 38, as shown in FIG. 4. Furthermore, as shown in FIG. 3 the second post 34 may be characterized by a cross-sectional plan view 40. The cross-sectional plan view 40 has a second substantially circular shape 42 that is complementary to the first circular shape 38, as shown in FIG. 5. FIG. 6 illustrates a second embodiment of the friction-weld interface device 26. According to the second embodiment, the first post 30 may also be characterized by a cross-sectional plan view 44 having a first substantially elliptical shape 46, as shown in FIG. 7. The cross-sectional plan view 48 has a second substantially elliptical shape 50 that is complementary to the first elliptical shape 46, as shown in FIG. 8. Functionally, the elliptical shapes 46 and 50 of FIGS. 7 and 8 provide an increased contact area at the friction-weld interface device 26 as compared with the circular shapes 38 and 42 of FIGS. 4 and 5. Regardless whether the cross-sectional plan views of the first and second posts 30, 34 have a circular or an elliptical shape, the complementary shapes are intended to substantially match and cover one another when the first post is joined with the second post.

As shown in FIGS. 3 and 6, the concave tapered surface 28 may be characterized by a cross-sectional side view having a first chevron shape, i.e., a general shape of a "V", and the convex tapered surface 32 is characterized by a side cross-sectional view having a second chevron shape. As shown, the first chevron shape of the concave tapered surface 28 includes a trough oriented in a direction substantially orthogonal to the axis in a first side view and a flat shape in a second side view that is rotated about the axis 90 degrees from the first side view. Additionally, the second chevron shape of the convex tapered surface 32 includes an apex oriented in the direction substantially orthogonal to the axis in the first side view that is complementary to the first chevron shape and a flat shape in the second side view. The first chevron shape of the concave tapered surface 28 is complementary to the second chevron shape of the convex tapered surface 32. The complementary chevron shapes of the tapered surfaces 28 and 32 shown in FIGS. 3 and 6 are designed to substantially match and cover one another when the first post 30 is joined with the second post 34. Thus, the concave tapered surface 28 and the convex tapered surface 32 of FIGS. 3 and 6 are specifically adapted to be friction-welded to one another by either a process of vibration-type friction-welding or a process of linear friction-welding when the friction-weld interface device 26 is arranged substantially along an axis 56 (as shown in FIG. 9).

Typically, in linear vibration welding the components sought to be joined together are placed in mutual contact and compressed. An external vibration force is subsequently applied to slip the components relative to each other, and perpendicular to the direction of the pressure being applied. The components are vibrated through a relatively small displacement, e.g., an amplitude in the range of approximately 1.0-1.8 mm in one possible embodiment, with a frequency of vibration of 200 Hz (high frequency), or in the range of approximately 2-4 mm at 100 Hz (low frequency), in the plane of the joint. A minor modification is angular friction-welding, which vibrates the materials by twisting or torquing them through a small angle with respect to the plane of the joint. Another friction-welding method where the components are kept under pressure while being oscillated laterally with respect to each other is linear friction-welding.

Figure 9:
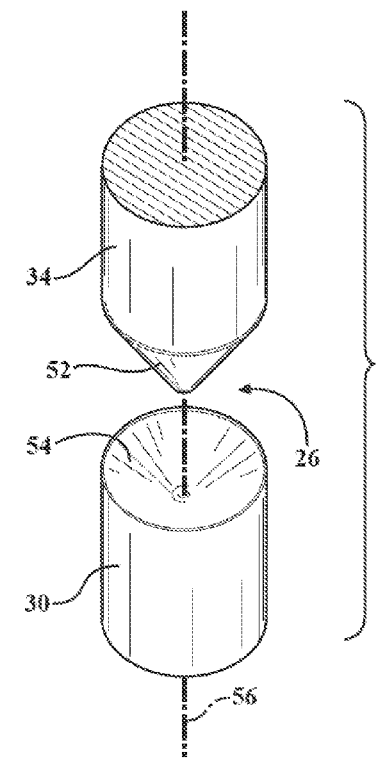
FIG. 9 illustrates a perspective view of a third embodiment of the friction-weld interface device shown in FIG. 2.

FIG. 9 illustrates a third embodiment of the friction-weld interface device 26. As shown in FIG. 9, the concave tapered surface 28 may be characterized by a first cone shape 52, while the convex tapered surface 32 may be characterized by a second cone shape 54 that is complementary to the first cone shape. The cone shapes 52 and 54 are fully symmetrical around an axis 56. The complementary cone shapes of the tapered surfaces 28 and 32 shown in FIG. 5 are designed to substantially match and cover one another when the first post 30 is joined with the second post 34. Because the friction-weld interface device 26 shown in FIG. 9 is fully symmetrical about axis 56, the concave tapered surface 28 and the convex tapered surface 32 of FIG. 9 are specifically adapted to be friction-welded to one another by a process of spin welding.

Spin welding systems consist of two tools for holding the components to be friction-welded, one of which is fixed and the other rotating. Before welding, one of the components is attached to the rotating tool along with a flywheel of a given weight. The component attached to the rotating tool is then spun up to a high rate of rotation by a motor to store the required energy in the flywheel. Once rotating at a proper speed, the motor is disengaged, and the components to be joined are brought into contact and forced together. The contact force is kept on the components after the relative rotation between the components stops, thereby allowing the weld to solidify or set.

Overall, fusing any of the above embodiments of the concave tapered surface 28 to the convex tapered surface 32 provides increased contact area at the friction-weld interface device 26 as compared with a flat-surface square contact, such as a lap, butt, or a t-joint. Accordingly, such an increased contact area at the friction-weld interface device 26 provides increased strength and an improved reliability friction-welded joint.

While the best modes for carrying out the invention have been described in detail, those familiar with the art to which this invention relates will recognize various alternative designs and embodiments for practicing the invention within the scope of the appended claims.

The invention claimed is:

1. A friction-weld interface device for improving a structural strength of an assembly, the interface device comprising:
 a first component having a concave tapered surface; and
 a second component having a convex tapered surface that is complementary to and is configured to receive the concave tapered surface of the first component such that the first and second components are arranged substantially along an axis;
 wherein the assembly is formed by friction welding the convex tapered surface to the concave tapered surface; and
 wherein the concave tapered surface has a first chevron shape with a trough oriented in a direction substantially orthogonal to the axis in a first side view and a flat shape in a second side view that is rotated about the axis 90 degrees from the first side view, and the convex tapered surface has a second chevron shape with an apex oriented in the direction substantially orthogonal to the axis in the first side view that is complementary to the first chevron shape and a flat shape in the second side view.

2. The friction-weld interface device of claim 1, wherein:
 the first component includes a first post having a first leading portion;
 the second component includes a second post having a second leading portion; and
 the concave tapered surface is formed on the first leading portion and the convex tapered surface is formed on the second leading portion.

3. The friction-weld interface device of claim 2, wherein the first post is characterized by a cross-sectional plan view having a first substantially circular shape and the second post is characterized by a cross-sectional plan view having a second substantially circular shape that is complementary to the first substantially circular shape.

4. The friction-weld interface device of claim 2, wherein the first post is characterized by a cross-sectional plan view having a first substantially elliptical shape and the second post is characterized by a cross-sectional plan view having a second substantially elliptical shape that is complementary to the first substantially elliptical shape.

5. The friction-weld interface device of claim 1, wherein the friction welding of the first component and the second component is accomplished by linear vibration welding.

6. The friction-weld interface device of claim 1, wherein the first and second components are each formed from a thermoplastic material.

7. The friction-weld interface device of claim 1, wherein the assembly formed by friction welding is that of an air-intake manifold for an internal combustion engine.

8. An internal combustion engine comprising:
 an air-intake manifold assembly structure having a first part joined to a second part and a friction-weld interface device arranged between the first and second parts and configured to reinforce the structure, the interface device including:
  a first component having a concave tapered surface; and
  a second component having a convex tapered surface that is complementary to and is configured to receive the concave tapered surface of the first component such that the first and second components are arranged substantially along an axis;
 wherein the air-intake manifold assembly is formed by friction welding the concave tapered surface to the convex tapered surface; and
 wherein the concave tapered surface has a first chevron shape with a trough oriented in a direction substantially orthogonal to the axis in a first side view and a flat shape in a second side view that is rotated about the axis 90 degrees from the first side view, and the convex tapered surface has a second chevron shape with an apex oriented in the direction substantially orthogonal to the axis in the first side view that is complementary to the first chevron shape and a flat shape in the second side view.

9. The engine of claim 8, wherein:
 the first component includes a first post having a first leading portion;
 the second component includes a second post having a second leading portion; and
 the concave tapered surface is formed on the first leading portion and the convex tapered surface is formed on the second leading portion.

10. The engine of claim 9, wherein the first post is characterized by a cross-sectional plan view having a first substantially circular shape and the second post is characterized by a cross-sectional plan view having a second substantially circular shape that is complementary to the first substantially circular shape.

11. The engine of claim 9, wherein the first post is characterized by a cross-sectional plan view having a first substantially elliptical shape and the second post is characterized by a cross-sectional plan view having a second substantially elliptical shape that is complementary to the first substantially elliptical shape.

12. The engine of claim 8, wherein the first and second components are each formed from a thermoplastic material, and wherein the friction welding of the first component and the second component is accomplished by linear vibration welding.

13. An air-intake manifold assembly structure for an internal combustion engine, the air-intake manifold assembly structure comprising:
 a first part joined to a second part and a friction-weld interface device arranged between the first and second parts and configured to reinforce the structure, the interface device including:
  a first component having a concave tapered surface; and
  a second component having a convex tapered surface that is complementary to and is configured to receive the concave tapered surface of the first component such that the first and second components are arranged substantially along an axis;
 wherein the air-intake manifold assembly is formed by friction welding the concave tapered surface to the convex tapered surface; and
 wherein the concave tapered surface has a first chevron shape with a trough oriented in a direction substantially orthogonal to the axis in a first side view and a flat shape in a second side view that is rotated about the axis 90 degrees from the first side view, and the convex tapered surface has a second chevron shape with an apex oriented in the direction substantially orthogonal to the axis in the first side view that is complementary to the first chevron shape and a flat shape in the second side view.

14. The air-intake manifold assembly structure of claim 13, wherein:
   the first component includes a first post having a first leading portion;
   the second component includes a second post having a second leading portion; and
   the concave tapered surface is formed on the first leading portion and the convex tapered surface is formed on the second leading portion.

15. The air-intake manifold assembly structure of claim 14, wherein the first post is characterized by a cross-sectional plan view having a first substantially circular shape and the second post is characterized by a cross-sectional plan view having a second substantially circular shape that is complementary to the first substantially circular shape.

16. The air-intake manifold assembly structure of claim 14, wherein the first post is characterized by a cross-sectional plan view having a first substantially elliptical shape and the second post is characterized by a cross-sectional plan view having a second substantially elliptical shape that is complementary to the first substantially elliptical shape.

17. The air-intake manifold assembly structure of claim 13, wherein the first and second components are each formed from a thermoplastic material, and wherein the friction welding of the first component and the second component is accomplished by linear vibration welding.

18. The air-intake manifold assembly structure of claim 13, wherein the first and second components are each formed from a thermoplastic material.

\* \* \* \* \*